United States Patent [19]
Lukich et al.

[11] Patent Number: 6,098,008
[45] Date of Patent: Aug. 1, 2000

[54] METHOD AND APPARATUS FOR DETERMINING FUEL CONTROL COMMANDS FOR A CRUISE CONTROL GOVERNOR SYSTEM

[75] Inventors: Michael S. Lukich, Chillicothe; James B. Maddock, Washington, both of Ill.

[73] Assignee: Caterpillar Inc., Peoria, Ill.

[21] Appl. No.: 08/978,325

[22] Filed: Nov. 25, 1997

[51] Int. Cl.$^7$ ............................................. B60K 31/00
[52] U.S. Cl. ............................................................. 701/93
[58] Field of Search ........................... 701/93, 101, 110, 701/112, 103, 102, 104, 123; 123/352, 357, 436, 381, 351, 359, 361, 480, 493, 299, 339.23; 180/179; 477/73, 107, 203, 108

[56] References Cited

U.S. PATENT DOCUMENTS

| | | | |
|---|---|---|---|
| 4,098,242 | 7/1978 | Anderson | 123/353 |
| 4,344,141 | 8/1982 | Yates | 701/123 |
| 4,370,960 | 2/1983 | Otsuka | 123/339.12 |
| 4,493,303 | 1/1985 | Thompson et al. | 123/357 |
| 4,495,913 | 1/1985 | Gray | 123/352 |
| 4,503,821 | 3/1985 | Miyaki et al. | 123/357 |
| 4,509,477 | 4/1985 | Takao et al. | 123/339.11 |
| 4,520,778 | 6/1985 | Nanjo et al. | 123/352 |
| 4,667,634 | 5/1987 | Matsumura et al. | 123/357 |
| 4,700,675 | 10/1987 | Otobe et al. | 123/339.23 |
| 4,715,339 | 12/1987 | Sagawa et al. | 123/357 |
| 4,736,726 | 4/1988 | Matsuno et al. | 123/501 |
| 4,914,597 | 4/1990 | Moncelle et al. | 701/95 |
| 4,933,863 | 6/1990 | Okano et al. | 701/110 |
| 4,957,083 | 9/1990 | Nakaniwa et al. | 123/436 |
| 4,993,389 | 2/1991 | Ahlborn et al. | 123/436 |
| 4,998,519 | 3/1991 | Kobayashi | 123/333 |
| 5,019,986 | 5/1991 | Londt et al. | 701/94 |
| 5,090,384 | 2/1992 | Ahlborn et al. | 123/436 |
| 5,163,398 | 11/1992 | Buslepp et al. | 123/339.21 |
| 5,172,666 | 12/1992 | Nonaka | 123/352 |
| 5,222,022 | 6/1993 | Adams et al. | 701/110 |
| 5,357,912 | 10/1994 | Barnes et al. | 123/357 |
| 5,445,128 | 8/1995 | Letang et al. | 123/436 |
| 5,479,899 | 1/1996 | Phelps | 123/463 |
| 5,553,589 | 9/1996 | Middleton et al. | 123/352 |
| 5,611,751 | 3/1997 | Ehrenhardt et al. | 477/73 |
| 5,619,966 | 4/1997 | Aubourg et al. | 123/339.22 |
| 5,642,707 | 7/1997 | Cerf et al. | 123/339.23 |
| 5,740,004 | 4/1998 | Livshiz et al. | 701/101 |
| 6,021,755 | 2/2000 | Maddock et al. | 123/361 |

FOREIGN PATENT DOCUMENTS 0453 760 10/1991 European Pat. Off. ........ B60K 31/04

*Primary Examiner*—Jacques H. Louis-Jacques
*Attorney, Agent, or Firm*—David M. Masterson; W. Bryan McPherson

[57] ABSTRACT

In one aspect of the present invention, a method for determining a fuel command for an engine having a cruise control system is disclosed. The method includes the steps of determining a desired engine speed, determining an actual engine speed, modifying the actual engine speed value in response to a previous value of the engine speed, and then determining the fuel command in response to the modified and desired engine speed.

16 Claims, 2 Drawing Sheets

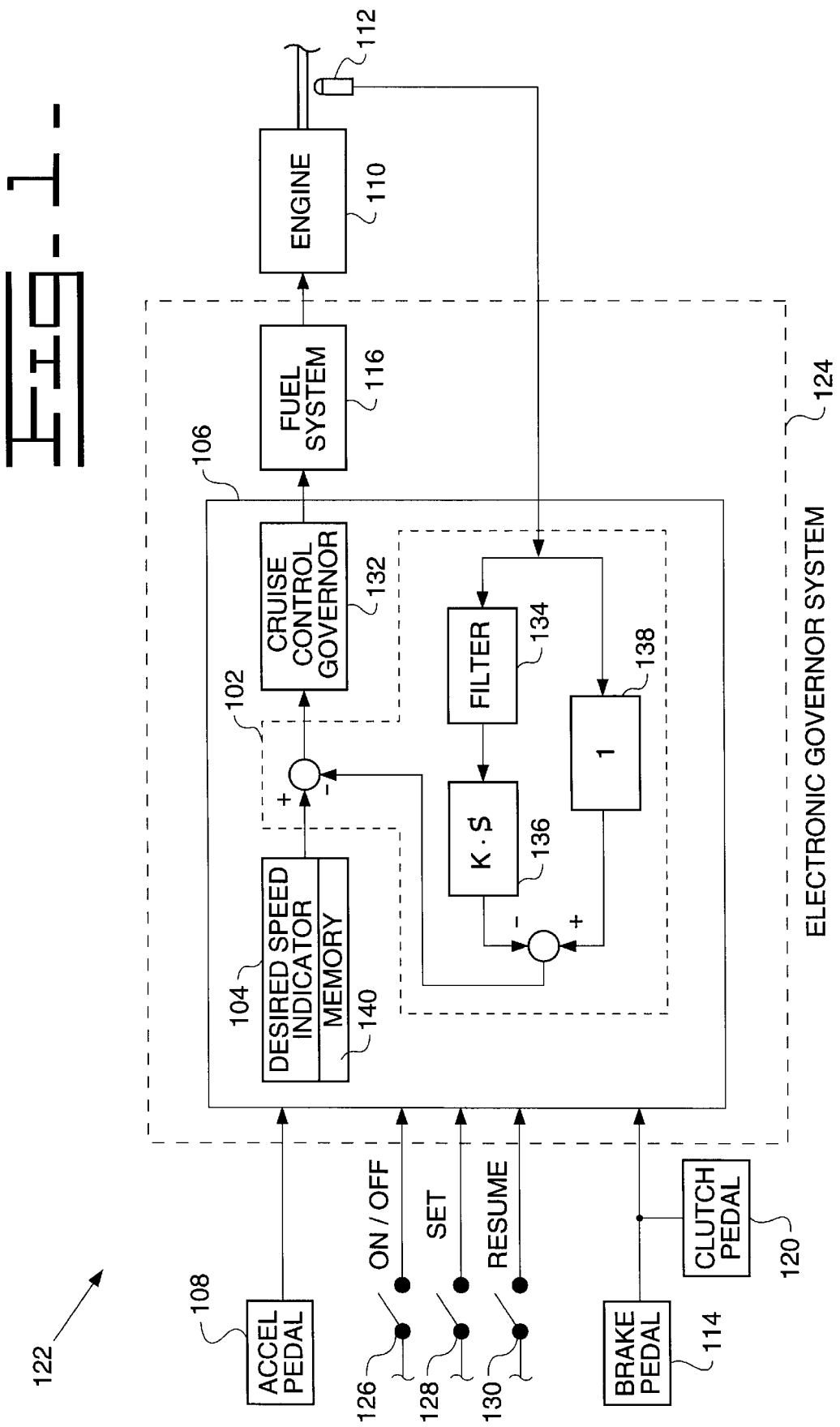

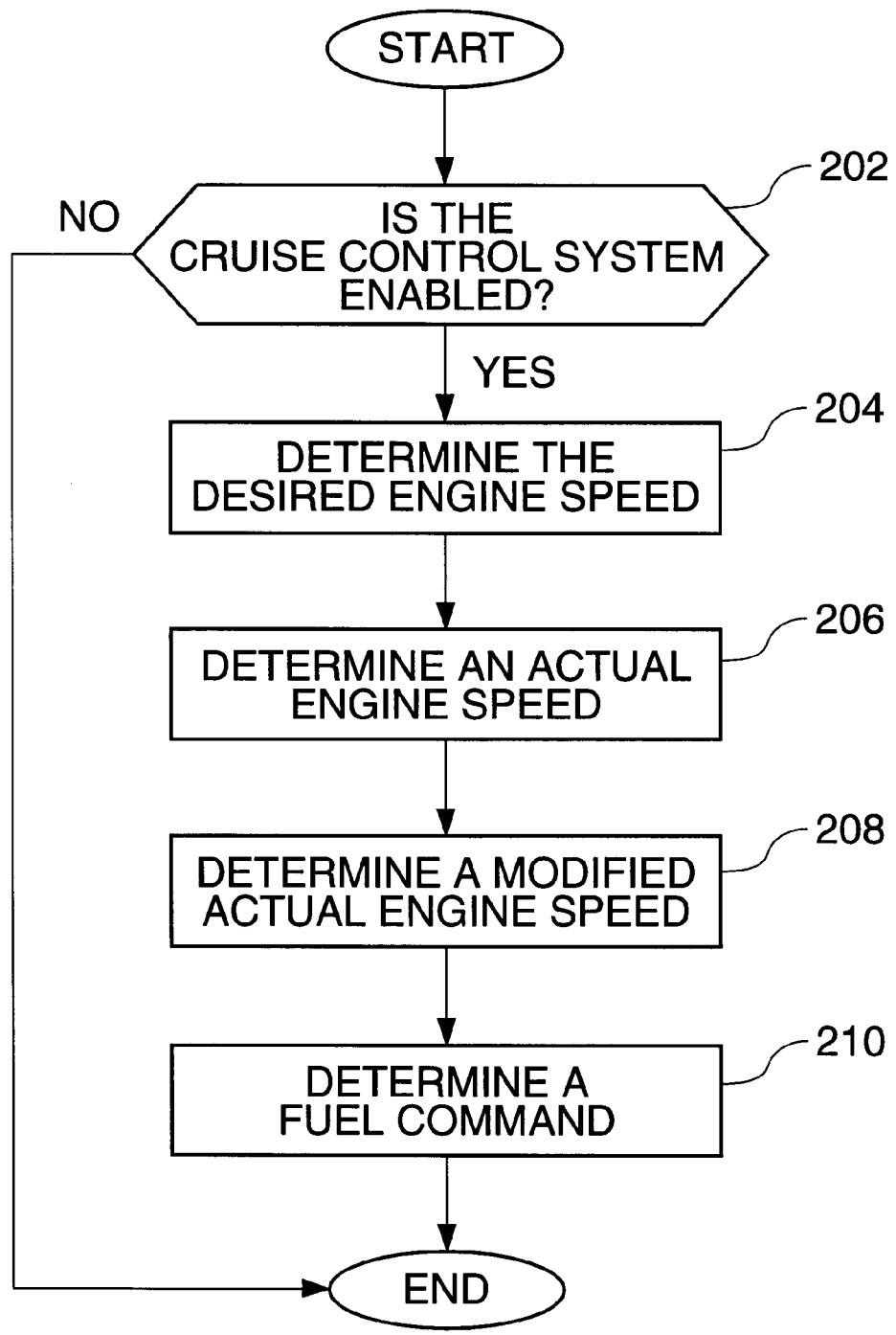

METHOD AND APPARATUS FOR DETERMINING FUEL CONTROL COMMANDS FOR A CRUISE CONTROL GOVERNOR SYSTEM

TECHNICAL FIELD

The present invention relates generally to a fuel control system, and more particularly, to a method for determining fuel control commands for a cruise control system.

BACKGROUND ART

Fuel quantity for an engine is determined by a governor. In typical fuel control systems, a governor bases the determination of how much fuel to provide the engine based on, in part, the actual speed and the desired speed of the engine. In a fuel control system having a cruise control system the cruise control system attempts to maintain the speed of the vehicle at a desired speed selected by the operator. A cruise control governor determines the amount of fuel to provide the engine, when the cruise control is active. In typical fuel control systems having a cruise control, when the cruise control is active, and change in engine load occurs, for example, a hill is encountered, the engine speed changes. There is a delay between the time the engine load changes, and the time the cruise control returns the actual engine speed to the desired engine speed. For example, if a hill is encountered, the engine speed will decrease. While the cruise control system will adjust the fuel command, the adjustment is reactive causing a delay in the return to the desired speed.

The present invention is directed to overcoming one or more of the problems as set forth above.

DISCLOSURE OF THE INVENTION

In one aspect of the present invention a method for determining a fuel command for an engine having a cruise control system is closed. The cruise control system includes an on state and an off state. The method includes the steps of determining a desired engine speed, determining an actual engine speed, and then determining the fuel command in response to the actual and desired engine speed.

BRIEF DESCRIPTION OF THE DRAWINGS

FIG. 1 is a block diagram of a fuel control system which encompasses the present invention; and, FIG. 2 is a flow chart of the disclosed method for determining a fuel command for an engine having a cruise control system.

BEST MODE FOR CARRYING OUT THE INVENTION

FIG. 1 illustrates an embodiment of a fuel control system 122 associated with the present invention. In the preferred embodiment, the fuel control system 122 is located within a mobile vehicle such as an earth moving machine, automobile, or truck. The present invention provides a method and apparatus for a fuel control system 122 having a cruise control system 106 to determine a fuel command for an engine 110, such that responsive engine performance will result. The fuel control system 122 includes an electronic governor system 124. The electronic governor system 124 includes the cruise control system 106 and a fuel system 116. The quantity of fuel to be delivered to an engine 110 is determined by the electronic governor system 124. Specifically, the cruise control governor 132 determines the amount of fuel to be delivered to the engine 110 based on desired and actual speed values. The cruise control system 106 receives an actual speed signal from a speed sensing device 112. The actual speed signal is indicative of the actual speed of the vehicle. In the preferred embodiment, the speed sensing device 112 is sensitive to the passing of gear teeth by a magnetic pickup mounted on the engine 110, as is well known in the art. Alternatively, a ground speed sensor could be used to produce the actual speed signal. The speed of the engine may be varied by an accelerator or throttle pedal 108 which is controlled by an operator of the vehicle. The accelerator or throttle pedal 108 delivers a desired speed signal to the cruise control system 106.

In the preferred embodiment, the cruise control system 106 also receives signals from three different sets of switches, including, a cruise control on/off switch 126, a cruise control set speed switch 128, and a cruise control resume switch 130.

When the cruise control on/off switch 126 is closed, a cruise control on signal is passed to the cruise control system 106 to turn the cruise control system on. When the cruise control set switch 128 is momentarily closed, the current speed of the engine 110 is detected by the speed sensing device 112 and is stored in memory 140, such as an EPROM, within the cruise control system 106 as the cruise control set speed. If the cruise control set speed switch 128 is closed for longer than a predetermined time, for example one second, the cruise control set speed is increased with time until the cruise control set speed switch 128 is opened. The cruise control resume switch 130, when momentarily closed, commands the control 106 to resume cruise control operation at the cruise control set speed. In the preferred embodiment, once the cruise control system is turned on and the resume cruise control switch 130 commands the controller 106 to resume speed, the cruise control system 106 is engaged. If the cruise control resume switch 130 is closed for longer than the predetermined time, the cruise control set speed is decreased with time until the cruise control resume switch 130 is opened. The cruise control system 106 additionally receives signals from a brake pedal 114 and a clutch pedal 120. When either the brake pedal 114 or clutch pedal 120 is depressed, a signal is delivered to the cruise control system 106 to disengage the cruise control mode of operation.

The method shown in FIG. 2 illustrates the method of operation of the present invention. The method shown in FIG. 2 is implemented in a software program and executed on a microprocessor. In a first decision block 202, the present state of the cruise control system 106 is determined by analyzing the signals from the cruise control on/off switch 126 and the cruise resume cruise control switch 130. In the preferred embodiment, if the cruise control on/off switch 126 is on, and the resume cruise control switch 130 has been set, then the cruise control system 124 is said to be enabled. If the state of the cruise control system 106 is not enabled, then control passes to the end of the method. If the cruise control system 106 is determined to be enabled, then program control passes to a first control block 204. In the first control block 204 the desired engine speed is sensed. In the preferred embodiment the desired speed indicator 104 retrieves the cruise control set speed from memory 140, and the cruise control set speed is then used as the desired speed. In a second control block 206, the actual speed of the engine 110 is sensed by reading the actual speed signal generated by the speed sensing device 112.

Control then passes to a third control block 208 to modify the actual engine speed. The actual engine speed signal is modified in a manner corresponding to recent changes in the engine speed. The actual engine speed signal is delivered to a derivative control feedback loop 102 (or rate control feedback loop), as illustrated in FIG. 1. The derivative control feedback loop 102 has two paths.

With regard to the first path of the derivative control feedback loop 102, in the preferred embodiment, the actual speed signal is passed through a filter 134. The filter reduces any noise that may be associated with the actual speed signal. The filtered speed signal is then passed to a control block 136. The control block 136 differentiates the filtered speed signal and then multiplies the resulting derivative speed value by a gain value to obtain a modified derivative speed value. The resulting derivative of the filtered speed value is indicative of any recent change in actual engine speed. The resulting derivative speed value is then modified by a gain value.

Engine responsiveness may vary with the size of the vehicle. Therefore, the gain value may vary between vehicle types to compensate for the different vehicle size. In the preferred embodiment the derivative speed value is multiplied by a gain value which is vehicle dependent. The gain value will also vary as a function of actual engine speed. The larger the actual engine speed, the larger the selected gain value is.

A gain map, implemented as a look-up table in the preferred embodiment, is used to determine the gain value. The actual speed value is used in conjunction with the gain map to determine the gain value. The number of gain values stored in the lookup table is dependent upon the desired precision of the system. A gain value is selected from the table corresponding to the actual engine speed. Numerical interpolation may be used to determine the actual gain value in the event the measured actual engine speed value falls between the discrete values used to form the look-up tables. The table values are derived from simulation and analysis of empirical data indicative of the engine dynamics. Although a look-up table is described, it is well known in the art that an empirical equation (or set of) may readily be substituted for the look-up table if greater accuracy is desired.

If the actual engine speed has increased, then the modified derivative speed value, is positive. If the actual speed has decreased then the modified derivative speed value is negative. Before the actual speed value has been differentiated, the value is stored in memory to be later used as the previous actual engine speed.

In the second path of the derivative control feed back loop 102, the actual speed signal is passed through a multiplier 138. In the preferred embodiment, the multiplier is one. The actual speed value of the second path is then combined with the modified derivative speed value of the first path resulting in a modified actual speed value. The modified actual engine speed value is than combined with the desired engine speed value. The resulting combination is delivered to the cruise control governor 132.

In a fourth control block 210, shown in FIG. 2, the cruise control governor 132 determines a fuel command based on the desired and modified actual engine speed signal, and delivers the command to the fuel system 116. The cruise control governor 132 acts in a manner well known in the art. The fuel system 116 then delivers the commanded amount of fuel to the engine 110. Program control then returns to the start of the method.

The method for dynamically determining a fuel command for an engine 110 having a cruise control system 124, and the associated look-up table, are embodied in a microprocessor based system which utilizes arithmetic units to control process according to software programs. Typically, the programs and associated look-up tables are stored in read-only memory, random-access memory or the like.

INDUSTRIAL APPLICABILITY

With reference to the drawings and in operation, the present invention is adapted to provide a method and apparatus for determining a fuel command for an engine having a cruise control system. The method of the present invention is operational when the cruise control system is enabled. The desired speed indicator 104 determines the desired engine speed. The cruise control governor 132 receives the desired engine speed and a modified actual engine speed and responsively determines a fuel command. In the preferred embodiment, the modified actual engine speed is determined using a derivative control feed back loop. The derivative control feed back loop receives the actual engine speed and produces the modified actual engine speed. If the actual engine speed has decreased from a previous value, then the modified actual engine speed has a value less than the actual engine speed. If the actual engine speed has increased from a previous value, then the modified actual engine speed has a value greater than the actual engine speed. The modified actual engine speed is then combined with the desired engine speed and delivered to the cruise control governor 132. The cruise control governor 132 responsively delivers a fuel command to the fuel system 116. The fuel system 116 delivers fuel to the engine 110 in response to the fuel command.

The derivative control feed back loop disclosed in the present invention, provides anticipation of impending changes in engine and vehicle speed, caused for example, by driving in hilly conditions. The actual engine speed is modified such that if the actual engine speed is decreasing, the value of the actual engine speed is proportionally reduced. The cruise control governor 132 then delivers a larger fuel command to the fuel control system 132 than had the actual engine speed not been modified. The increased fuel command results in an increased fuel amount to the engine 110 providing a the reduction or elimination of an undershoot engine speed condition that would have otherwise occurred. However, on a level road, the actual engine speed would not be modified because the derivative of the actual engine speed would be zero.

Other aspects, objects, and features of the present invention can be obtained from a study of the drawings, the disclosure, and the appended claims.

What is claimed is:

1. A method for determining a fuel command for an engine having a cruise control system, comprising the steps of:

determining a desired engine speed;

sensing an actual engine speed;

determining a derivative of said actual engine speed;

determining a modified actual engine speed based upon said derivative and said actual engine speed;

determining an engine speed error in response to said modified actual engine speed and said desired engine speed; and, determining said fuel command in response to said engine speed error.

2. A method as set forth in claim 1, wherein the step of determining a modified actual engine speed includes the steps of:

dynamically determining a gain value; and, determining said modified actual engine speed in response to said derivative actual engine speed and said dynamically determined gain value.

3. A method as set forth in claim 2, wherein the step of determining said modified actual engine speed further includes the steps of:

determining whether said actual speed derivative is less than zero, and responsively determining if said modified actual engine speed is less than said actual engine speed; and, determining whether said actual speed derivative is greater than zero, and responsively determining if said modified actual engine speed is greater than said actual engine speed.

4. A method as set forth in claim 2, wherein the step of determining said modified actual engine speed further includes the steps of:

determining said modified actual engine speed is less than said actual engine speed when said actual speed derivative is less than zero; and, determining said modified actual engine speed is greater than said actual engine speed when said actual speed derivative is greater than zero.

5. A method as set forth in claim 4, wherein determining said fuel command further includes the steps of:

increasing said fuel command when said actual speed derivative is less than zero; and, decreasing said fuel command when said actual speed derivative is greater than zero.

6. A method as set forth in claim 1, wherein the step of determining a modified actual engine speed includes the steps of:

determining a previous actual engine speed;

determining said modified actual engine speed in response to said actual engine speed and said previous actual engine speed; and storing said actual engine speed as said previous actual engine speed.

7. A method as set forth in claim 6, wherein the step of determining said modified actual engine speed includes the steps of:

determining said actual engine speed is less than said previous actual engine speed and responsively determining said modified actual engine speed is less than said actual engine speed; and, determining said actual engine speed is greater than said previous actual engine speed and responsively determining said modified actual engine speed is greater than said actual engine speed.

8. A method, as set forth in claim 1, wherein the step of determining a modified actual engine speed includes the steps of:

dynamically selecting a gain value in response to said actual engine speed;

determining said modified actual engine speed in response to multiplying said derivative actual engine speed by said dynamically selected gain.

9. A method, as set forth in claim 8, wherein the step of determining a modified actual engine speed includes the steps of:

determining a multiplied actual engine speed by operating on said actual engine speed with a desired multiplier; and determining said modified actual engine speed in response to combining said multiplied actual engine speed with said multiplied derivative engine speed.

10. An apparatus for determining a fuel command for an engine having a cruise control system, comprising:

an actual speed sensing means for sensing an actual speed of the engine and responsively producing an actual speed signal;

a desired speed sensing means for determining a desired speed of the engine and responsively producing a desired speed signal;

a derivative control feedback loop for receiving said actual speed signal, differentiating said actual speed, modifying said actual speed in response to said derivative, and producing a modified actual speed signal; and, a cruise control governor means for receiving said desired speed signal and said modified actual speed signal, and responsively determining said fuel command.

11. An apparatus for determining a fuel command for an engine having a cruise control system, comprising:

an actual speed sensor being adapted to sense an actual speed of said engine and responsively produce an actual speed signal;

a desired speed sensor being adapted to sense a desired speed of said engine and responsively produce an desired speed signal;

a derivative control feedback loop being adapted to receive said actual speed signal, differentiate said actual speed, dynamically determine a gain value, modify said actual speed in response to said derivative and said dynamically determined gain value, and produce a modified actual speed signal; and, a cruise control governor being adapted to receive said desired speed signal and said modified actual speed signal, and responsively determine said fuel command.

12. An apparatus, as set forth in claim 11, wherein said gain value is dynamically selected in response to said actual engine speed.

13. A method for determining a fuel command for an engine (110) having a cruise control system (106), comprising the steps of:

determining a desired engine speed;

sensing an actual engine speed;

determining a derivative of said actual engine speed;

dynamically selecting a gain value in response to said actual engine speed;

modifying said derivative actual engine speed with said gain value;

determining a modified actual engine speed in response to said modification;

determining an engine speed error in response to said modified actual engine speed and said desired engine speed; and, determining said fuel command in response to said engine speed error.

14. A method as set forth in claim 13, wherein the step of determining said modified actual engine speed further includes the steps of:

determining whether said actual speed derivative is less than zero, and responsively determining if said modified actual engine speed is less than said actual engine speed; and, determining whether said actual speed derivative is greater than zero, and responsively determining if said modified actual engine speed is greater than said actual engine speed.

15. A method as set forth in claim 13, wherein the step of determining said modified actual engine speed further includes the steps of:

determining said modified actual engine speed is less than said actual engine speed when said actual speed derivative is less than zero; and, determining said modified actual engine speed is greater than said actual engine speed when said actual speed derivative is greater than zero.

16. A method as set forth in claim 15, wherein determining said fuel command further includes the steps of:

increasing said fuel command when said actual speed derivative is less than zero; and, decreasing said fuel command when said actual speed derivative is greater than zero.

* * * * *